April 12, 1960

R. P. CROW 2,932,794

SUBCARRIER SEPARATION SYSTEM

Filed July 29, 1954

INVENTOR.
Robert P. Crow

BY Mueller & Aichele

Attys.

United States Patent Office 2,932,794
Patented Apr. 12, 1960

2,932,794

SUBCARRIER SEPARATION SYSTEM

Robert P. Crow, Park Ridge, Ill., assignor to Motorola, Inc., Chicago, Ill., a corporation of Illinois Application July 29, 1954, Serial No. 446,493

9 Claims. (Cl. 328—156)

This invention relates to coupling circuits and more particularly to a coupling network for applying a plurality of signals closely spaced in frequency to a single load.

In communication systems of various types it is necessary to apply a variety of signals of differing frequencies to a single load impedance which may be a common channel, the input to transmission means, or the like. A more particular example is the application of several subcarrier signals to a single carrier system. However, in such systems where more than one signal is transmitted at once it is generally necessary to provide rather elaborate filter networks to prevent one signal from being coupled into the source of another signal. If the signals are widely spaced in frequency to reduce this intercoupling and prevent inter-modulation among adjacent signals, the bandwidth limits of the equipment may impose a limitation on the number of signals that may be used in the system without undue attenuation thereof. System performance may be further limited in a given case because of a reduction in signal level by mutual loading of sub-carrier transmitters, or because of an intentional reduction of sub-carrier transmitter output to prevent intermodulation from occurring in the output amplifiers caused by the presence of other signals in the output.

It is an object of the present invention to provide a simple and inexpensive coupling circuit for applying signals in a group within a certain frequency range to a single load impedance.

A further object is to provide a circuit for coupling a plurality of signals differing in frequency within a limited spectrum to a common load with but a minimum of interference one with another.

Still another object of the invention is to provide an improved subcarrier coupling network for coupling a plurality of signal sources producing signals of differing frequency to a single load impedance, which network has increased selectivity for signals applied back from the load impedance to each source so that the closely spaced signals may be coupled to the load without interference between the sources.

A feature of the invention is the provision of a signal coupling circuit for coupling each of a plurality of signal sources producing signals spaced in close frequency relation to a single load, with the circuit being connected to a point in the signal source of substantially lower effective impedance than that of the load so that but a minimum amount of signal may be coupled from the load to the signal source.

Another feature is the provision of a system for applying several signals of differing frequencies to a single load without interference with one another wherein each source includes a degenerative circuit providing a low output impedance and each source is coupled to the load through a series tuned circuit.

Further objects, features and the attending advantages thereof will be apparent upon consideration of the following description when taken in conjunction with the accompanying drawings in which.

In practicing the invention there is provided a system including a plurality of sub-carrier signal sources or the like coupled to a single load impedance. The sources are each coupled by a series tuned circuit connected to a point on the source which is of considerably less impedance than that of the load. This low impedance point may be provided by the use of degeneration in the signal source, such as by the use of a cathode follower output stage. The tuned coupling system for each source, therefore, has a higher Q than normal because of the lower total circuit resistance. The combination of its relatively high impedance to signals of slightly different frequency and the low effective internal impedance of the output amplifier greatly attenuates signals from the load which originate in other sources. This permits the use of sources closely spaced in frequency without interference with one another.

Figure 1:
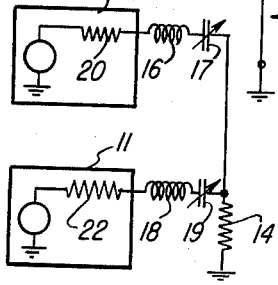
Fig. 1 is a simplified representation of a coupling circuit constructed in accordance with the invention.

Fig. 1 shows signal sources 10 and 11 each with outputs applied to load impedance 14 through the series tuned circuits 16, 17 and 18, 19 respectively. Represented with signal source 10 is the internal impedance 20 presented thereby to the coupling network and a similar internal impedance 22 is represented with the signal source 11. In accordance with the present invention, the series tuned circuits are each resonant at the frequency of the signal emitted by the associated signal source, and the internal impedance presented by each signal source is very low and is considerably lower than that of the load impedance 14. Since each signal source impedance is made very low, and a relatively high impedance is presented by the series resonant circuit to signals of other frequency from the load, the selectivity of each coupling circuit is high. Accordingly, any signal coupled to a source from another signal source through the common load will be developed largely across the inductance or capacitor elements of the tuned circuit rather than the low internal source impedance. This provides effective isolation of the sources so that sources spaced closely in frequency can be satisfactorily used.

Figure 2:
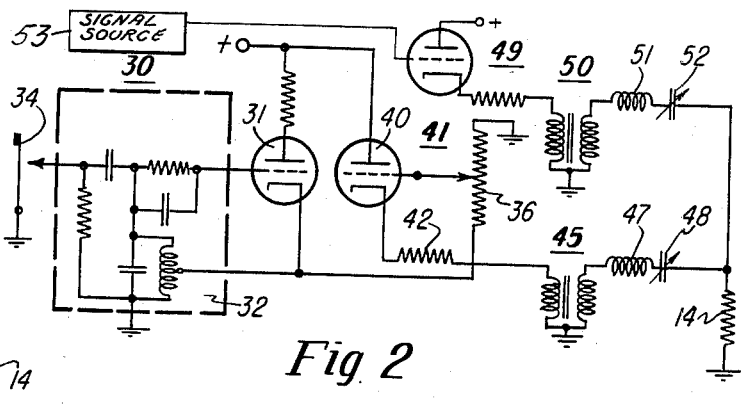
Fig. 2 is a schematic representation of signal sources incorporating the invention.

In the circuit of Fig. 2, there is shown an oscillator circuit 30 including the electron valve 31 which is connected to a frequency determining network 32 with this network being controlled by key 34. When the key 34 is closed, the circuit constants of the frequency determining network 32 are changed so that frequency shift keying is provided for the oscillator 30. The output from the oscillator is taken from a tap point along resistor 36 which is in the cathode circuit of the electron valve 31. This signal is then applied to valve 40 which is incorporated in the output amplifier stage 41. Between ground and the cathode of valve 40 a resistor 42 and the primary winding of transformer 45 are connected. Resistor 42 is for bias purposes and is relatively low in value, but may be by-passed to reduce the impedance. The secondary winding of transformer 45 is connected between ground and the series tuned circuit including inductor 47 and capacitor 48 and the load impedance 14. Transformer 45 has a low impedance secondary winding compared to the primary winding and it is further coupled to an apparent low impedance circuit in the amplifier, namely the cathode circuit of valve 40. Therefore the Q of the tuned circuit 47, 48 will be higher than with the normal value of source impedance and the signal will be selectively coupled from amplifier 41 to the load 14. Furthermore a signal generated by signal source 53 and coupled to amplifier stage 49 and applied by transformer 50 to the load 14 through tuned circuit 51, 52, may not be coupled back into amplifier 41 in any appreciable degree since the impedance across which the signal might develop is very small as compared to that of the tuned circuit 47, 48 to this adjacent channel signal from stage 49.

Figure 3:
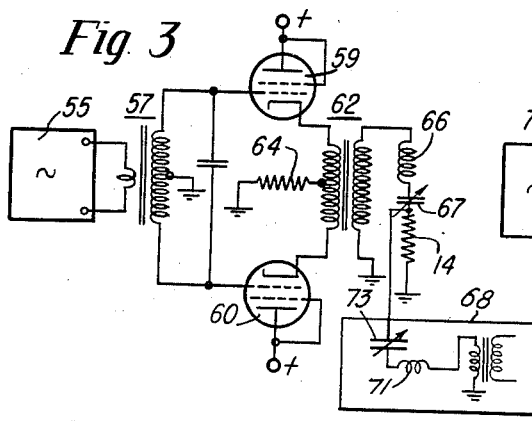
Fig. 3 is a schematic representation of the invention as used with a push-pull output circuit.

The circuit of Fig. 3 is a push-pull output circuit similar to the single-ended circuit described in Fig. 2. A signal source 55 is coupled to transformer 57 which applies a signal to the grid circuit of valves 59 and 60 which are arranged in push-pull. The cathodes of valves 59 and 60 are connected together through the primary winding of transformer 62 which has a center tap connected to ground through the bias resistor 64. The secondary winding of transformer 62 is connected through the series tuned circuit combination of inductor 66 and capacitor 67 to the load impedance 14. This circuit then provides cathode follower action so that the impedance appearing in the secondary winding of transformer 62 is very low compared to the load impedance 14 thereby providing the action described in connection with Fig. 1. Signal source 68 is also coupled to the load 14 through a similar output circuit including the tuned circuit comprising inductor 71 and capacitor 73.

Typical values for a circuit such as that shown in Fig. 3 for adjacent signals of 100 kilocycles and 101 kilocycles are as follows:

| | |
|---|---|
| Valves 59, 60 | 50L6. |
| Resistor 64 | 100 ohms. |
| Transformer 62 | 5,000 ohm pri., 50 ohm sec. |
| Inductance 66 | 8.0 mhy. |
| Capacitor 67 | 316 mmf. |
| Load 14 | 50 ohms. |
| Apparent amplifier internal impedance as seen from secondary of transformer | 2–3 ohms. |

It is to be understood that these are given merely by way of an example of a particular embodiment of the invention which is not intended to be limiting thereof.

Figure 4:
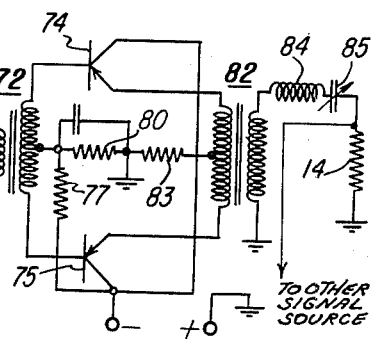
Fig. 4 is a schematic representation of the invention as used with a transistor amplifier output circuit.

The circuit shown in Fig. 4 incorporates transistors in the output amplifier. A signal source 70 is connected to the primary winding of transformer 72 while the secondary winding of this transformer applies the signal to the bases of transistors 74 and 75. A center tap on the secondary winding of transformer 72 is connected through resistor 77 to a potential negative with respect to ground thereby, in combination with resistor 80 which is connected between the center tap and ground, providing a negative bias for the bases of the transistors. The emitters of the two transistors are each connected to one end of the primary winding of transformer 82 while a center tap of this transformer is returned through resistor 83 to ground. The secondary winding of transformer 82 is connected across the load impedance 14 through the series tuned circuit including inductor 84 and capacitor 85. This circuit then will also present a low impedance at the secondary winding of transformer 82 due to the degenerative coupling provided in the transistor amplifier circuit.

Figure 5:
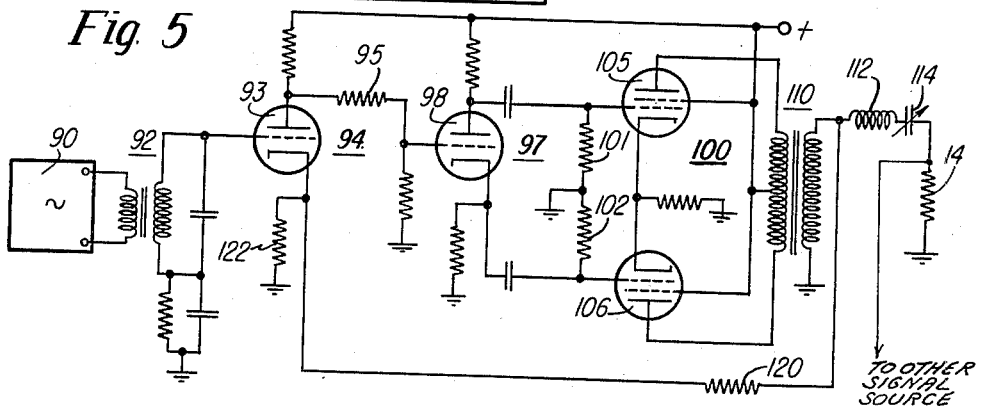
Fig. 5 is a schematic representation of an output amplifier circuit utilizing a further embodiment of the invention.

The circuit of Fig. 5 is a further embodiment of the invention and it may be noted that a different type of feedback circuit is incorporated herein. A signal source 90 is connected through transformer 92 to the input circuit of the valve 93 incorporated in the amplifier 94. This amplifier is directly coupled through resistor 95 to the input circuit of amplifier 97 which includes the valve 98. The amplifier 97 is then coupled to the input circuit of the push-pull amplifier 100. The coupling is accomplished by applying a signal which appears across valve 98 to resistors 101 and 102 which are connected between the grids of valves 105 and 106 incorporated in the push-pull amplifier 100. The output of the amplifier 100 is applied to transformer 110 in a known manner by connecting the primary winding thereof across the plate of the valves 105 and 106 with the center tap of this winding supplying B+ for the anodes of these valves.

The secondary winding of transformer 110 is coupled across load impedance 14 through the series tuned circuit combination including inductor 112 and capacitor 114. In this embodiment the low impedance at the output stage of the signal source is provided through a negative feedback network coupled from the cathode circuit of amplifier 94 to the connection of the series tuned circuit and the secondary winding of transformer 110. This connection may be made through resistor 120 to the cathode bias resistor 122 of valve 93 in order to incorporate the proper amount of negative feedback in the circuit.

The coupling circuit of the present invention provides, therefore, a simple and inexpensive circuit for applying a plurality of signals spaced within a limited frequency spectrum to a single load impedance. The circuit greatly reduces intercoupling among the various signal sources when more than one signal source is operating at the same time. Furthermore, the selectivity of the resulting network used with each signal source is very great so that the adjacent signals will not intermodulate even though closely spaced to one another. It has been possible with the circuit as described herein to space signals in the 100 kilocycle region as close as 1 kilocycle apart without reduction in power or harmful effects.

While particular embodiments of the invention have been shown and described, changes may be made and it is intended to cover all such changes and modifications as fall within the scope of the invention in the appended claims.

What is claimed is:

1. A coupling system for applying a plurality of signals to a common load of predetermined characteristic, said system including in combination, a plurality of signal sources producing signals of different frequencies and each including an amplifier circuit having output means with an effective impedance lower than the impedance of the common load, a plurality of series resonant coupling networks each connecting said output means of a signal source to the common load and being tuned to the frequency of the associated source, whereby each coupling network presents a low impedance to the signals of the associated source being applied therefrom to the load, and a substantially higher impedance to signals from the other sources to thereby reduce intercoupling among said signal sources.

2. A system for applying a plurality of signals spaced within a limited frequency spectrum to a common load, said system including in combination, a plurality of signal sources of different frequencies each having output impedance means, a plurality of series tuned circuit means individually coupled between said output impedance means of said sources and the load and tuned to the frequency of the associated source, said signal sources including degenerative feedback means for reducing the effective impedance of said output impedance means thereof, whereby each tuned circuit has high selectivity with respect to signals from said common load and presents a high impedance to signals from other signal sources thereby reducing interference between said sources.

3. A coupling system for applying a plurality of signals spaced within a limited frequency spectrum to a common load, said system including in combination, a plurality of signal sources of different frequencies, each including output means having an impedance less than the impedance of the common load, a plurality of series tuned circuits each being coupled between said output impedance means of one source and the common load with each circuit being tuned to the frequency of the associated source, said signal sources each including a degenerative feedback circuit associated therewith for reducing the effective impedance of said output means, whereby each tuned circuit and the associated output means form a high Q circuit which presents a high impedance to signals applied to the common load from the other signal sources thereby reducing interference between said sources.

4. A system for coupling a plurality of signals to a single load of selected impedance, said system including in combination, a plurality of sources of signals of differing frequencies, each source having a pair of transsistors connected in a degenerative output circuit of substantially less impedance than the selected impedance, each source including a series tuned circuit resonant at the frequency of the source and connected to the single load, and transformer means included in each source and coupled between the associated tuned circuit and said output circuit whereby each signal is selectively applied to said load impedance through a high Q coupling circuit to prevent intercoupling among said signal sources.

5. A coupling system for applying a plurality of signals of different frequencies to a single load of selected impedance, said system including in combination, a plurality of signal sources operative at differing frequencies, each source including an input circuit and a pair of electron discharge valves in a push-pull output circuit, each source also including a series tuned circuit resonant at the frequency of the associated source and coupled to the single load, first circuit means included in each source coupling said push-pull output circuit to said tuned circuit, and second circuit means included in each source connected to said tuned circuit and to said input circuit to apply a degenerative signal to said tuned circuit so that each signal is applied to the load impedance at high selectivity to prevent intercoupling among the signals.

6. A system for coupling a plurality of signals to a single load of selected impedance, said system including in combination, a plurality of sources of signals of differing frequencies, each source having a transistor connected in an output circuit of substantially less impedance than the selected impedance, each source also including a series tuned circuit resonant at the frequency of the source and connected to the single load, and each source further including transformer means coupled between the associated tuned circuit and said output circuit whereby each signal is selectively applied to said load impedance through a high Q coupling circuit to prevent intercoupling among said signal sources.

7. A coupling system for applying a plurality of signals of different frequencies to a single load of selected impedance, said system including in combination, a plurality of signal sources operative at differing frequencies, each source including input circuit means, an electron discharge device and an output circuit, each source further including a series tuned circuit resonant at the frequency of the associated source and coupled to the single load, said output circuit including a portion coupled to said tuned circuit, a portion connected to said input circuit to apply a degenerative signal to said tuned circuit thereby providing a low apparent impedance in said output circuit and increasing the Q of said tuned circuit and output circuit so that each signal is selectively applied to the load impedance to prevent intercoupling among the signals.

8. A system for applying a plurality of signals of differing frequencies to a single load of predetermined impedance, said system including in combination, a common output circuit coupled to the load, a plurality of signal sources operative at different frequencies each having an output stage including an electron discharge valve having a cathode, transformer means coupled to said cathode, and circuit means forming a series tuned circuit resonant at the operative frequency of the source coupling said transformer means to said common output circuit, said electron discharge device providing cathode follower action to reduce the effective impedance of said transformer means coupled thereto and to thereby increase the Q of the circuit formed by the tuned circuit and said transformer means, each of said circuit means applying signals from the source of which it is a part to said common output circuit and presenting an impedance to such signals substantially less than the impedance presented thereby to signals in said common output circuit which are applied thereto from the other sources, thereby reducing interference between said sources.

9. A system for applying a plurality of signals of different frequencies to a single load of predetermined impedance, said system including in combination, a common output circuit coupled to the load, a plurality of signal sources operative at different frequencies each having an output stage including a pair of electron discharge devices in a push-pull arrangement, said devices having electron emission elements, transformer means in each signal source with a first portion coupled to each electron emission element, and circuit means in each signal source including a further portion of said transformer means forming a series tuned circuit resonant at the operative frequency of the source, such series tuned circuit coupling the associated source to said common output circuit, each electron discharge device providing cathode follower action to reduce the effective impedance of said transformer means coupled thereto and to thereby increase the Q of said circuit means, and each of said tuned circuits applying signals from the source of which it is a part to said common output circuit and presenting an impedance to such signal substantially less than the impedance presented thereby to signals at said common output circuit applied thereto from the other sources, thereby reducing interferences between said sources.

References Cited in the file of this patent

UNITED STATES PATENTS

| | | |
|---|---|---|
| 1,546,878 | Alexanderson | July 21, 1925 |
| 2,096,782 | Brown | Oct. 26, 1937 |
| 2,210,028 | Doherty | Aug. 6, 1940 |
| 2,605,333 | Job | July 29, 1952 |
| 2,666,819 | Raisbeck | Jan. 19, 1954 |
| 2,704,791 | Koch | Mar. 22, 1955 |
| 2,761,022 | Tongue et al. | Aug. 28, 1956 |
| 2,768,351 | Scholten et al. | Oct. 23, 1956 |
| 2,776,373 | Mishler | Jan. 1, 1957 |